United States Patent [19]

Paul et al.

[11] Patent Number: 4,694,520

[45] Date of Patent: Sep. 22, 1987

[54] PATIENT SUPPORT APPARATUS

[75] Inventors: Patrick R. D. Paul, Johns Island; James H. Price, Mt. Pleasant, both of S.C.

[73] Assignee: SSI Medical Services, Inc., Charleston, S.C.

[21] Appl. No.: 819,119

[22] Filed: Jan. 15, 1986

[51] Int. Cl.[4] ................... A47C 27/10; G08B 21/00
[52] U.S. Cl. ................................. 5/453; 5/449; 5/455; 5/469; 340/540
[58] Field of Search .............. 5/449, 455, 453, 469, 5/454; 340/540, 568; 52/2

[56] References Cited

U.S. PATENT DOCUMENTS

| | | | |
|---|---|---|---|
| 10,139 | 10/1853 | Scott | 5/449 |
| 595,734 | 12/1897 | Rand et al. | 5/445 |
| 1,755,205 | 4/1930 | Christensen | 5/449 |
| 3,353,309 | 11/1967 | Kwake | 52/2 |
| 3,505,695 | 4/1970 | Bishaf et al. | 5/449 |
| 3,810,262 | 5/1974 | Strand | 52/2 |
| 3,866,606 | 2/1975 | Hargest | 5/453 |
| 3,949,438 | 4/1976 | Scales | 5/453 |
| 4,048,684 | 9/1977 | Korner et al. | 5/453 |
| 4,068,334 | 1/1978 | Randall | 5/453 |
| 4,225,989 | 10/1980 | Corbett et al. | 5/455 |
| 4,306,322 | 12/1981 | Young et al. | 5/449 |
| 4,394,784 | 7/1983 | Swenson et al. | 5/453 |
| 4,542,547 | 9/1985 | Sato | 5/453 |

FOREIGN PATENT DOCUMENTS

| | | | |
|---|---|---|---|
| 1353908 | 5/1974 | United Kingdom | 52/2 |
| 1545806 | 5/1979 | United Kingdom | 5/455 |

Primary Examiner—William F. Pate, III
Assistant Examiner—Michael Safavi
Attorney, Agent, or Firm—Dority & Manning

[57] ABSTRACT

An improved patient support system including a fluid inflatable support for receiving a patient thereon; a fluid supply source in communication with said fluid support, a detector associated with said fluid support means for monitoring the degree of inflation of said support, and control valving, switching or the like operatively associated with said fluid supply and said detector to actuate said fluid supply responsive to predetermined input from said detector.

8 Claims, 4 Drawing Figures

PATIENT SUPPORT APPARATUS

BACKGROUND OF THE INVENTION

This invention relates to an improved fluidized patient support system that is of particular advantage to burn patients, as well as other patients who are immobilized for extended recuperative periods.

Historically, hospital beds for patients have in general been conventional where, though adjustable as to height and attitude, a mattress-springs arrangement has been provided for receiving the patient thereon covered, of course, with appropriate bed clothing. Particular problems have developed in use of the conventional hospital beds where the patients, due to prolonged contact with the support surface in generally immobile conditions, have developed decubitus ulcers or bed sores, as a result of pressure points between the support surface and certain portions of the patient's body. Additionally, in the case of burn patients where the severity of the injury or wound was such that the patient was affected over a significant portion of his body, the conventional bed presented problems not only with the healing process due to contact between raw areas of the human body and the support, but also due to fluids exuding from the patient's body. In like fashion, other types of injuries and reasons for confinement have presented problems with the conventional hospital bed.

In order to obviate some of the problems inherent with the conventional hospital bed, fluidized patient support structures have been developed as exemplified in the Hargest U.S. Pat. No. 3,428,973 in which a tank is provided, partially filled with a mass of granular material which is received atop a diffuser surface and is covered with a loose fitting flexible patient contact sheet or surface. Fluid, such as air, is provided in a plenum chamber beneath the diffuser surface and is forced through the diffuser surface for fluidization of the granular material, preferably ceramic spheres, with adequate force that a patient received on the flexible sheet is suspended on the fluidized bed. In this fashion, very gentle forces are imparted to the affected body portions of the patient, whereby the incidence of development of decubitus ulcers is reduced and whereby an individual experiencing trauma, such as produced by severe burns may rest comfortably.

In similar fashion, a further fluidized patient support structure is disclosed in the Hargest U.S. Pat. No. 3,866,606 which structure has the same basic elements of that mentioned above with the addition of control means to cyclically fluidize the granular material, also preferably ceramic spheres. In a non-fluidized state, the patient settles into the mass of granular materials which becomes a rigid, body contoured, structure against which the patient's body may be placed in traction. In like fashion, the cyclic effect of fluidizing-rigidifying the mass of granular material permits variation in patient attitude, again towards variance of constant pressures on affected body portions and thus reduction of the incidence of development of decubitus ulcers.

In both of the fluidized patient support systems described above, there is, for an adult patient, generally a minimum depth of about 12 inches of fluidized granular material located above the diffuser board to preclude any contact between the body of the patient and the diffuser board when the patient is in a sitting position on the bed.

In other support systems, fluid support means may be provided as exemplified by air filled structures. These other fluid filled support structures through an improvement over the conventional mattress supports, are not considered to be as effective as the fluidized support systems noted above, are generally much less expensive, and thus more available for general use. In all of the structures mentioned above, it is important from a standpoint of comfort and effectiveness of support, that the patient have adequate support beneath the body to hold the body above an underside of the support structure. In other words, it is highly desirable that the patient not "bottom out" against an underlying rigid surface of the support system.

Obviously, in any fluid supported system, a number of problems may evolve resulting in inadequate fluid support of a patient. Such problems can result from inadequate fluid supply, leakage of fluid from the structure and the like. The support system of the present invention provides an arrangement for sensing such inadequate patient support and, depending on the fault, corrects same or alerts attending personnel to the problem which is not simply correctable by introduction of further fluid, reinflation or the like. There is no known prior art that anticipates or suggests the invention of the present invention.

SUMMARY OF THE INVENTION

It is an object of the present invention to provide an improved fluid patient support system.

Another object of the present invention is to provide an improved fluid patient support system which includes provision for ensuring adequate fluid for proper patient support.

Still further another object of the present invention provides a fluid patient support system that is provided with means to detect inadequate patient support and to initiate correction of same.

Yet another object of the present invention is to provide a fluid patient support system having means thereon to sense a patient settling too deeply into the support and effecting the supply of further fluid thereto adequate to for return the patient to a properly supported position.

Generally speaking, the patient support system according to the present invention comprises a support frame; a fluid patient support means supported by said frame; means for supplying fluid to said fluid support means for support of a patient in a supine position thereon; detector means associated with said fluid support means for determining inadequate support of a patient residing thereon; and control means operatively associated with said fluid supply means and said detector means for receiving input from said detector means that support of the patient is inadequate and initiating further fluid supply to said support means responsive to said input for at least a predetermined period of time.

More specifically, in a preferred arrangement, the detector means is pressure sensitive, whereby should a patient settle into the fluid support means adequate to directly or indirectly apply a predetermined pressure on the detector means, the fluid supply means will be actuated by the control means to supply further fluid to the support means. In a fluid envelope environment, the detector means may simply be located therebeneath.

Employing an air compressor as a fluid supply means, the detector means is operatively associated with a control means for the compressor to actuate or deactuate same. The compressor control means may take many forms, but preferably is operative in conjunction with the detector means to continue to supply air to the support until the patient is properly supported whereby the detector means is deactuated. Simultaneously, timer means may also be employed therewith, preset to actuate an alarm after a predetermined period of compressor operation; set to operate for a predetermined period of time after deactuation of the detector means, or the like. The preset time for actuation of an alarm would be greater than that normally required for reinflation or refluidization, and would be indicative of malfunction of the support means.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENTS

Making reference to the figures, preferred embodiments of the present invention will now be described in detail.

Figure 1:
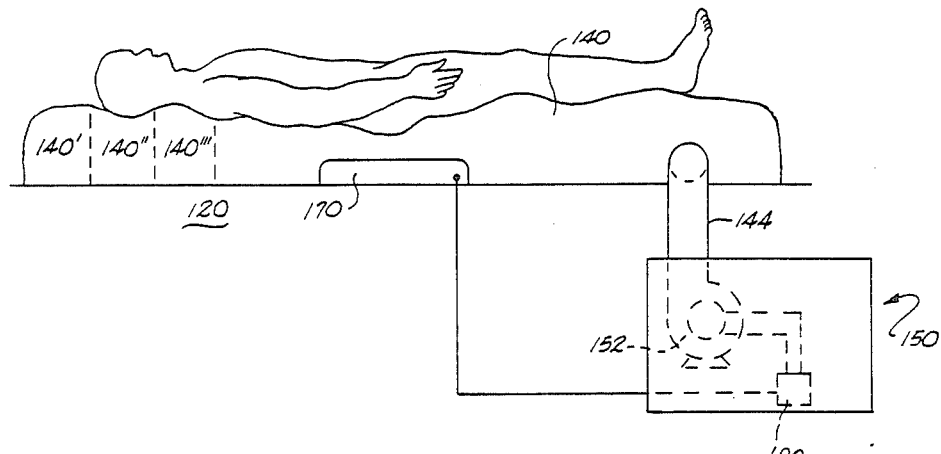
FIG. 1 is a schematic illustration of a preferred embodiment of a patient support system according to the present invention demonstrating proper patient support.
Figure 2:
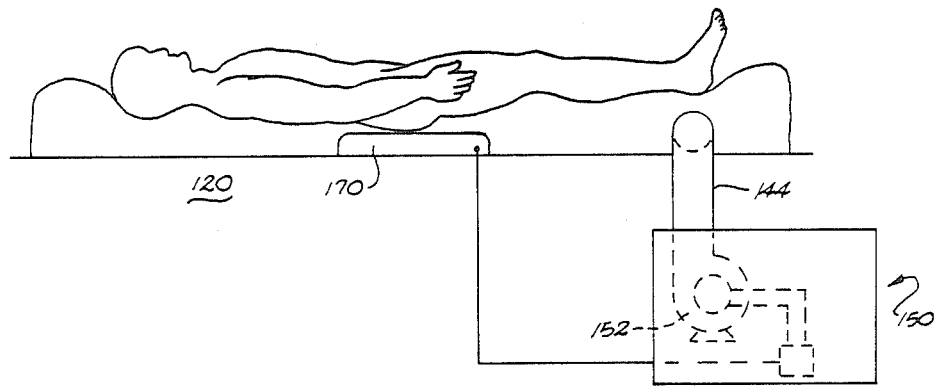
FIG. 2 is a schematic illustration of the embodiment of FIG. 1 demonstrating improper patient support.

As illustrated in FIGS. 1 and 2, a support system for a supine patient is shown to be an air inflatable mattress 140, with mattress 140 being manufactured of a flexible material such that upon inadequate inflation of same the weight of a patient residing thereon will collapse the mattress structure. Mattress 140 as illustrated in FIGS. 1 and 2, rests on a suitable base or frame 120, and is in operative association via a tubular conduit 144 with a fluid supply system generally 150, which preferably includes an air compressor 152.

In general, according to the embodiments shown in FIGS. 1 and 2, once mattress 140 is inflated, air compressor 152 is deactuated and the degree of inflation may be maintained by appropriate valving, not shown. Additionally, in certain embodiments, mattress 140 could be provided with a plurality of small vent openings which could dictate continuous operation of air compressor 152. Should, however, adequate deflation of mattress 140 result, removing the necessary patient support, the patient will settle into mattress 140 and defeat the purpose of the system (see FIG. 2). In order to monitor such an occurrence, a sensor means 170 is located beneath or within mattress 140 and is operatively connected to fluid supply means 150. Sensor means 170 may be pressure sensitive, or any other type sensing means that would indicate the inadequacy of inflation of mattress 140 as represented by proximity of a patient thereto. Hence, should the patient settle into mattress 140 adequately to actuate sensor 170, sensor 170 will provide input to a control means 180 associated with fluid supply means 150 in an arrangement as, for example, is illustrated in FIGS. 3 and 4, to cause actuation of compressor 152 adequate to return mattress 140 to a proper degree of inflation.

Figure 3:
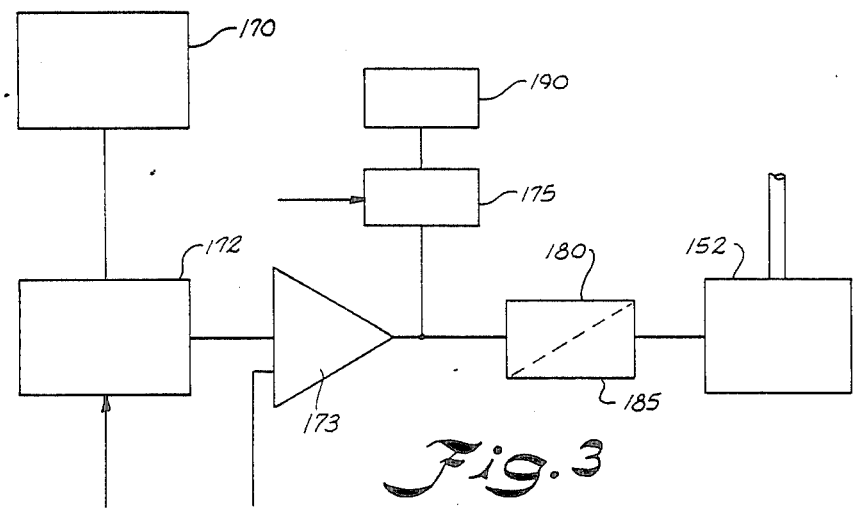
FIG. 3 is an electrical schematic diagram of a control system for a patient support system according to the present invention.

In a most preferred embodiment, as schematically illustrated in FIG. 3 a timer means 185 could be associated with sensor means 170 and control means 180 to permit air compressor 152 to continue to operate for a predetermined period of time after removal of actuation pressure from sensor means 170. A full return to proper fluidization would thus be achieved. A further timer means 175 may also be employed in conjunction with sensor means 170 to become actuated simultaneously with control means 180 such that should air compressor 152 continue to operate for the full preset time of the timer means, such would indicate serious malfunction of the system and actuate an alarm 190 operatively associated with timer 175. Attending personnel would then become alerted to a malfunction of the system requiring corrective action beyond normal refluidization.

Figure 4:
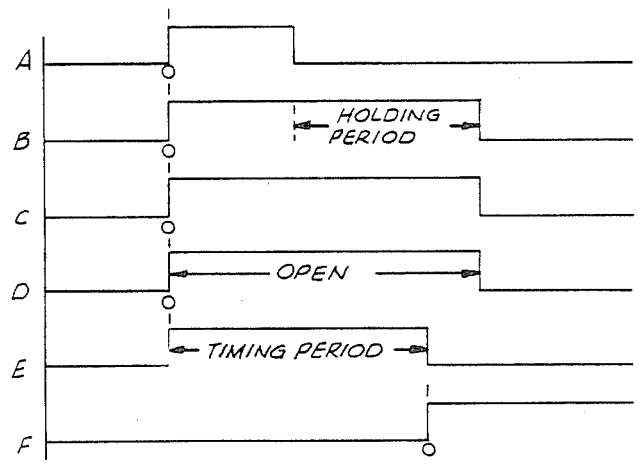
FIG. 4 is a schematic illustration of a timing chart for the controls arrangement as illustrated in FIG. 3.

FIGS. 3 and 4, illustrate one preferred arrangement for an overall control system according to the present invention. Once sensor 170 is actuated by pressure above a present threshold value, output from same to a sample and hold circuit 172 causes circuit 172 to move to a higher value to provide output to a control valve 180 for actuation of same. Sample and hold circuit circuit 172 thereafter continues to sample input from sensor 170, and so long as input is detected, circuit 172 holds at the higher value. Hold circuit 172 may further include a variable holding period feature which maintains the high value for a predetermined period of time after deactuation of sensor 170. Such time allows continued fluidization adequate to return to a normal support state and would be utilized in lieu of a timer 185 as mentioned above. Such variable time is indicated on line B of the timing chart of FIG. 4.

Simultanously with actuation of control valve 180, a preset timer means 175 is actuated. Timer means 175 is operatively associated with an alarm means 190 which may be visual and/or aural, and if the preset time lapses before resetting of timer means 175, such will indicate abnormal malfunction of the system and alarm 190 will be actuated to signal attending personnel. Timer means 175 is indicated on line E of the timing chart of FIG. 4.

In an embodiment as mentioned above where vent openings are included in the inflatable support, control means 180 may not be an off-on valve or switch means since continuous fluid may be required to replenish that escaping through the vent openings. Instead, control means 180 would be located between mattress 140 and compressor, 52 (shown in phantom in FIG. 1), and would be further opened to permit greater fluid flow therethrough, or conversely, though not shown could be a potentiometer that increases or decreases the voltage of a motor associated with air compressor 152. In the embodiment shown in FIGS. 1 and 2, control means 180 would preferably be an on-off control means since under normal operations once the envelope is inflated, no further fluid would be admitted unless deflation occurs.

In FIG. 4, a suitable timing chart is illustrated. Line A represents sensor means 170, line B represents sample and hold circuit 172, line C represents a switching amplifier 173, line D represents the control means 180, line E represents the timer means 175 and line F the alarm 190. At level 0, each of the elements is in a deactivated state while at level 1 each is in an excited or actuated state. Hence as can be seen, once sensor 170 is actuated, all of the elements in the system are activated with the exception of alarm 190.

Circuit 172 then remains at level 1 so long as sensor 170 is actuated and for a predetermined holding period thereafter, adequate to continue fluid supply for support of the patient well above sensor 170. Switching amplifier 173 remains on coincident with hold circuit 172 for amplification of the output signal therefrom. Control means 180 remains actuated (open, further open, higher fan speed, etc.) during the period of output from amplifier 173. As mentioned hereinabove, timer 175 is preset for a period of time that should be more than adequate to return the fluid support means to a proper supporting function, wherefore, should the time set on timer 175 lapse, such would indicate a more serious malfunction in the system. Alarm 190 would then be actuated to alert attending personnel.

While mattress 140 is schematically illustrated as a single element, a plurality of individual air bags may be utilized as now appear in certain commercial systems and as illustrated in phantom as 140', 140'' in FIG. 1. In such systems, a number of air bags, 10 to 15 for example may be the same in all bags or may vary along the length of the overall unit depending upon the anatomical body section in contact therewith. With the plural bag arrangement, one or more sensors 170 may be employed.

It will be understood, of course, that while the forms of the invention herein describe constitute preferred embodiments of the invention, it is not intended to illustrate all possible forms of the invention. It will also be understood that the words used are words of description rather than of limitation and that various changes may be made without departing from the spirit and scope of the invention herein disclosed.

What is claimed is:

1. An improved fluid support system comprising:
   (a) a support frame;
   (b) an inflatable patient support means support by said frame;
   (c) means for supplying fluid to said inflatable support means for support of a patient in a supine position thereon;
   (d) detector means associated with said support means for determining inadequate inflation of said support means when a patient is residing thereon;
   (e) timer means operatively associated with said detector means whereby said timer means is actuated simultaneously with said detector means and is deactuated upon cessation of operation of said fluid supply means; and
   (f) control means operatively associated with said fluid supply means and said detector means for receiving input from said detector means that said support means is inadequately inflated and admitting fluid supply to said support means responsive to said input.

2. An improved fluid support system as defined in claim 1 wherein the inflatable patient support means is an inflatable envelope.

3. An improved fluid support system as defined in claim 2 wherein said detector means is a pressure sensor.

4. An improved fluid support system as defined in claim 2 further comprising alarm means operatively associated with said timer means, said timer means actuating said alarm after a predetermined period of operation of said fluid supply means.

5. An improved fluid patient support as defined in claim 1 wherein said inflatable patient support means comprises a plurality of juxtaposed inflatable air bags.

6. An improved fluid support system for a patient comprising:
   (a) a support frame;
   (b) an inflatable support envelope;
   (c) fluid supply means in communication with said envelope;
   (d) control means operatively associated with said fluid supply means for actuation and deactuation of said supply of fluid to said envelope;
   (e) detector means operatively associated with said envelope for determination of inadequate fluid within said envelope and operatively associated with said fluid supply control means, whereby upon detection of inadequate fluid within said envelope, said control means actuates said fluid supply means to cause fluid to be supplied to said envelope for a predetermined period of time ;and
   alarm means operatively associated with said control means, said alarm means becoming actuated after a predetermined period of time.

7. An improved fluid patient support as defined in claim 6 wherein said control means maintains said supply means in a state of actuation so long as said detector means remains actuated.

8. An improved fluid patient support system as defined in claim 6 further comprising timer means operatively associated with said detector means and said control means, said timer means causing continued actuation of said fluid supply means for a predetermined period of time following deactuation of said detector means.

* * * * *